(12) United States Patent
Haas et al.

(10) Patent No.: US 9,201,989 B2
(45) Date of Patent: Dec. 1, 2015

(54) INTERPOLATION TECHNIQUES USED FOR TIME ALIGNMENT OF MULTIPLE SIMULATION MODELS

(71) Applicant: International Business Machines Corporation, Armonk, NY (US)

(72) Inventors: Peter J. Haas, San Jose, CA (US); John Sismanis, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 371 days.

(21) Appl. No.: 13/750,751

(22) Filed: Jan. 25, 2013

(65) Prior Publication Data

US 2014/0214372 A1    Jul. 31, 2014

(51) Int. Cl.
*G06F 17/50*    (2006.01)

(52) U.S. Cl.
CPC ........ *G06F 17/5009* (2013.01); *G06F 17/5018* (2013.01); *G06F 2217/84* (2013.01)

(58) Field of Classification Search
USPC .................................. 703/2, 22; 375/240.26
See application file for complete search history.

(56) References Cited

U.S. PATENT DOCUMENTS

| | | | |
|---|---|---|---|
| 6,609,085 B1 | 8/2003 | Uemura et al. | |
| 7,027,516 B2 * | 4/2006 | Anderson et al. | ........ 375/240.26 |
| 7,194,394 B2 | 3/2007 | Dorfman et al. | |
| 7,421,380 B2 | 9/2008 | Thiesson et al. | |
| 7,631,319 B2 | 12/2009 | Miller et al. | |
| 7,660,707 B2 | 2/2010 | Maruyama et al. | |
| 7,716,011 B2 | 5/2010 | Thibaux et al. | |
| 8,712,740 B2 * | 4/2014 | Morio et al. | ...................... 703/2 |
| 2007/0118041 A1 | 5/2007 | Nishiura et al. | |
| 2007/0147519 A1 | 6/2007 | Takayama et al. | |
| 2007/0233435 A1 | 10/2007 | Bradski | |
| 2009/0030614 A1 | 1/2009 | Carnegie et al. | |
| 2009/0281839 A1 | 11/2009 | Lynn et al. | |
| 2010/0064275 A1 | 3/2010 | Akkiraju et al. | |
| 2011/0066411 A1 * | 3/2011 | Morio et al. | ...................... 703/2 |
| 2011/0066649 A1 | 3/2011 | Berlyant et al. | |
| 2011/0243271 A1 | 10/2011 | Takahashi et al. | |

(Continued)

FOREIGN PATENT DOCUMENTS

| | | |
|---|---|---|
| CN | 102750309 A | 10/2012 |
| GB | 2310118 A | 8/1997 |
| WO | 2008024153 A2 | 2/2008 |

OTHER PUBLICATIONS

Paige, C. C. et al., "Solution of Sparse Indefinite Systems of Equations and Least Square Problems", Database entry Copyright (c) Software Patent Institute, IPCOM000150589D, electronic publication Apr. 18, 2007, 50 pages.

(Continued)

*Primary Examiner* — Thai Phan
(74) *Attorney, Agent, or Firm* — Cantor Colburn LLP (57) ABSTRACT

Embodiments include a method, system, and computer program product for performing time alignments. The method includes receiving a specification request for generating a set of target time-series data from a set of source time-series data and obtaining specification information relating to the set of target time-series data and relating to the set of source time-series data. The specification also includes time intervals between data values. The method also includes converting the set of source time-series data to the set of target time-series data, wherein said converting includes calculating a set of cubic-spline interpolation constants.

25 Claims, 7 Drawing Sheets

(56) References Cited

U.S. PATENT DOCUMENTS

2011/0283099 A1 11/2011 Nath et al.
2011/0295774 A1 12/2011 Chen et al.
2014/0172503 A1* 6/2014 Hammerstrom et al. .... 705/7.31

OTHER PUBLICATIONS

Bergland, John et al., "Integrating Systems Through Universal Transformation Using IBM WebSphere Transformation Extender", Websphere Software, IBM Corp. 2009, 28 pages.
Cefkin, Melissa et al., "Splash: A Progress Report on Building a Platform for a 360 Degree View of Health", Proceedings of the 5th INFORMS Workshop on Data Mining and Health Informatics (DM-HI 2010), 6 pages.
Haas, Laura M. et al., "Clio Grows Up: From Research Prototype to Industrial Tool", SIGMOD Jun. 14-16, 2005, pp. 805-810.
Howe, Bill, "SciDB Examples from Environmental Observation and Modeling", Oregon Health & Science University Center for Coastal Margin Observation and Prediction, Nov. 19, 2008, 9 pages.
Howe, Bill and Maier, David, "Algebraic manipulation of scientific datasets", VLDB Journal (2005) 14(4): pp. 397-416.
Huang, Yun-Wu and Yu, Philip S., "Adaptive Query Processing for Time-Series Data", ACM 1999 1-58113-143-7/99/08, pp. 282-286.
Hudson, M. et al., "Simplication of Semantically-Rich Model Transformations Through Generated Transformation Blocks", 2011 18th IEEE International Conference and Workshops on Engineering of Computer-Based Systems, pp. 261-268.
IBM, "Automated Ontological Mapping for Metadata", IP.com Publication IPCOM000191276D, publication date: Dec. 24, 2009, 5 pages.
Tan, Wang-Chiew et al., "Splash: A Platform for Analysis and Simulation of Health", IHI '12, Jan. 28-30, 2012, Miami FL, USA, 10 pages.
U.S. Appl. No. 13/750,789; Non-Final Office Action, Date Filed: Jan. 25, 2013; Date Mailed Jun. 11, 2015; 22 pages.

* cited by examiner

| 1 | $a_{1,1}$ | $a_{1,2}$ | $b_1$ | $x_1$ |
|---|---|---|---|---|
| 2 | $a_{2,1}$ | $a_{2,3}$ | $b_2$ | $x_2$ |
| 3 | $a_{3,2}$ | $a_{3,4}$ | $b_3$ | $x_3$ |
| 4 | $a_{4,3}$ | $a_{4,5}$ | $b_4$ | $x_4$ |
| 5 | $a_{5,4}$ | $a_{5,5}$ | $b_5$ | $x_5$ |
| 6 | $a_{6,5}$ | $a_{6,7}$ | $b_6$ | $x_6$ |
| 7 | $a_{7,6}$ | $a_{7,8}$ | $b_7$ | $x_7$ |
| 8 | $a_{8,7}$ | $a_{8,9}$ | $b_8$ | $x_8$ |
| 9 | $a_{9,8}$ | $a_{9,10}$ | $b_9$ | $x_9$ |
| 10 | $a_{10,9}$ | $a_{10,11}$ | $b_{10}$ | $x_{10}$ |
| 11 | $a_{11,10}$ | $a_{11,12}$ | $b_{11}$ | $x_{11}$ |
| 12 | $a_{12,11}$ | $a_{12,13}$ | $b_{12}$ | $x_{12}$ |
| 13 | $a_{13,12}$ | $a_{13,14}$ | $b_{13}$ | $x_{13}$ |

Rows 1–7: split 1
Rows 6–13: split 2

Stratum $s = 1$

FIG. 5A

| | | | |
|---|---|---|---|
| 1 $a_{1,1}$ | $a_{1,2}$ | $b_1$ | $x_1$ |
| 2 $a_{2,1}$ | $a_{2,3}$ | $b_2$ | $x_2$ |
| 3 $a_{3,2}$ | $a_{3,4}$ | $b_3$ | $x_3$ |
| 4 $a_{4,3}$ | $a_{4,5}$ | $b_4$ | $x_4$ |
| 5 $a_{5,4}$ | $a_{5,5}$ | $b_5$ | $x_5$ |
| 6 $a_{6,5}$ | $a_{6,7}$ | $b_6$ | $x_6$ |
| 7 $a_{7,6}$ | $a_{7,8}$ | $b_7$ | $x_7$ |
| 8 $a_{8,7}$ | $a_{8,9}$ | $b_8$ | $x_8$ |
| 9 $a_{9,8}$ | $a_{9,10}$ | $b_9$ | $x_9$ |
| 10 $a_{10,9}$ | $a_{10,11}$ | $b_{10}$ | $x_{10}$ |
| 11 $a_{11,10}$ | $a_{11,12}$ | $b_{11}$ | $x_{11}$ |
| 12 $a_{12,11}$ | $a_{12,13}$ | $b_{12}$ | $x_{12}$ |
| 13 $a_{13,12}$ | $a_{13,14}$ | $b_{13}$ | $x_{13}$ |

Rows 1–7 — split 1; Rows 6–13 — split 2

Stratum $s = 2$

FIG. 5B

| 1 | $a_{1,1}$ | $a_{1,2}$ | $b_1$ | $x_1$ |
| 2 | $a_{2,1}$ | $a_{2,3}$ | $b_2$ | $x_2$ |
| 3 | $a_{3,2}$ | $a_{3,4}$ | $b_3$ | $x_3$ |
| 4 | $a_{4,3}$ | $a_{4,5}$ | $b_4$ | $x_4$ |
| 5 | $a_{5,4}$ | $a_{5,5}$ | $b_5$ | $x_5$ |
| 6 | $a_{6,5}$ | $a_{6,7}$ | $b_6$ | $x_6$ |
| 7 | $a_{7,6}$ | $a_{7,8}$ | $b_7$ | $x_7$ |
| 8 | $a_{8,7}$ | $a_{8,9}$ | $b_8$ | $x_8$ |
| 9 | $a_{9,8}$ | $a_{9,10}$ | $b_9$ | $x_9$ |
| 10 | $a_{10,9}$ | $a_{10,11}$ | $b_{10}$ | $x_{10}$ |
| 11 | $a_{11,10}$ | $a_{11,12}$ | $b_{11}$ | $x_{11}$ |
| 12 | $a_{12,11}$ | $a_{12,13}$ | $b_{12}$ | $x_{12}$ |
| 13 | $a_{13,12}$ | $a_{13,14}$ | $b_{13}$ | $x_{13}$ |

Rows 1–7 — split 1; Rows 6–13 — split 2

Stratum $s = 3$

FIG. 5C

INTERPOLATION TECHNIQUES USED FOR TIME ALIGNMENT OF MULTIPLE SIMULATION MODELS

BACKGROUND

The present disclosure relates generally to simulation modeling and more particularly to interpolation techniques used for time alignment of multiple simulation models.

Modern policy, planning, and investment decisions are often made in the context of a complex system. Making good policy and investment decisions requires not just the gathering, mining, statistical analysis, and visualization of data, but also the use of simulation models that can predict future behaviors. Simulation modeling has become a very important field recently because it allows for analysis of data and provides predictions and explanations relating to future outcomes of each alternate decision.

The design of useful and robust simulation models is complicated because high level decisions frequently require understanding of multilayered interactions relating to diverse systems across a great many domains and disciplines, in order to gain synergistic understanding of highly complex problems while avoiding unintended consequences of policy and investment decisions. Monolithic models of complex systems are usually difficult and expensive to build, verify, validate, and maintain, and a more successful approach is to compose many different individual models across a wide variety of disciplines. Although better than a monolithic approach, collaborative modeling and simulation is far from trivial. The individual models are often pre-existing and heterogeneous, having been created by domain experts who have different worldviews and vocabularies, sit in different organizations, and have invested much effort in developing and implementing their models using different programming and development paradigms. A resulting complication is that collaborative simulation modeling requires the exchange of large-scale, high-resolution data generated by both real-world and simulated processes, and must be handled in an efficient and scalable manner. It is often the case that some large number of real or simulated data measurements (source data) are available for exchange, but a potential consumer of the data needs measurements at a different set of times or locations from what is available to form the desired set of target data. Frequently, the source data are available at irregular time points—as is typical with data produced by stochastic discrete-event simulation models—or at irregular points in space, whereas the data consumer needs the target data to be given at regular intervals in space or time. Even when the data are available at regular time points, the source data may be coarser than the desired target data, or the sets of source and target time points may not line up. These mismatch problems can arise more generally in other data-exchange or data-integration settings, such as data warehousing.

BRIEF SUMMARY

Embodiments include a method, and computer program product for performing time alignments. A method includes receiving a specification request for generating a set of target time-series data from a set of source time-series data and obtaining specification information relating to the set of target time-series data and relating to the set of source time-series data. This method also includes time intervals between data values. It also includes converting the set of source time-series data to the set of target time-series data, wherein said converting includes calculating a set of cubic-spline interpolation constants.

In an alternate embodiment, a method for use with a cluster of processors each of which has at least one associated memory device is provided. The method includes: (a) assigning data to said processors, wherein some of said data are assigned to more than one of said processors, said data residing on said associated memory devices; (b) for each processor, partitioning said data assigned to that processor into strata; (c) for each processor, selecting one of the strata for processing; (d) for each processor, asynchronously executing steps in a "minimizing" process for the data in the selected stratum. Steps (c) and (d) are repeated for at least one other stratum until a stopping condition is reached.

The method provides processing communication between a plurality of simulation models running on a plurality of processors and receiving output time-series data from a first of the simulation models. The output data are to be used as input to a second of the simulation models. The method also includes determining any mismatches in measurement times between those in the said output data from the first simulation model and those required in the input data to the second simulation model and computing, by interpolation, a plurality of missing data values so that said output data from the first simulation model can be used as said input data for the second simulation model.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
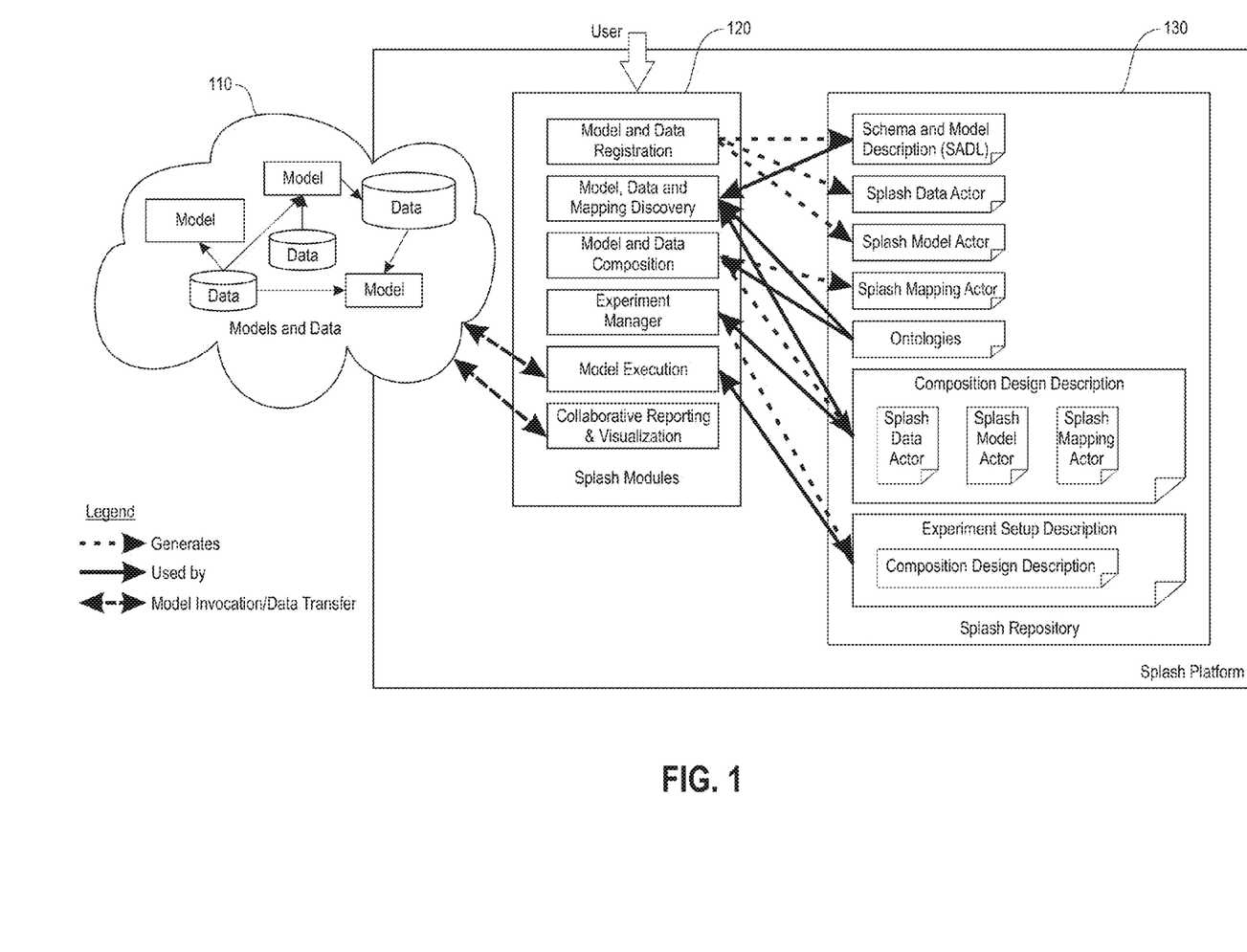
FIG. 1 depicts a block diagram illustrating components used in collaborative modeling in accordance with an embodiment.

Simulation modeling is used increasingly in guiding policy and investment decisions around highly complex issues such as population health and safety. At times a number of simulation models are needed to be combined with one another to analyze different and very dissimilar aspects to solve a larger problem. Each predictive simulation model often generates large-scale and high-resolution data that need to be combined with other data that are being generated by other real world processes. The resulting challenge is not only in dealing with these massive datasets, but also to build a single composite model that brings together multiple models across a broad range of disciplines. FIG. 1 depicts a block diagram of a system for creating such a composite simulation model, as per one embodiment of the present invention.

FIG. 1 illustrates a single composite simulation model solution 110 with several integrated component models and datasets. In one embodiment, the simulation models can be each handled by a processor or a computer. To enable such solution, a number of separate simulation models are used together collaboratively and data flows seamlessly across different domains having different and dissimilar processes. Such a flow requires the output of one process to be used as the input of another process. For ease of understanding, FIG. 1 will be discussed using the Smarter Planet Platform for Analysis and Simulation of Health (hereinafter Splash) platform that can be implemented by a computer or processor. However, as can be appreciated by those skilled in the art, Splash is only used for discussion purposes and in alternate embodiments other platforms can also be used to provide similar solutions.

Splash provides a platform for combining existing heterogeneous simulation models and datasets across a broad range of disciplines to capture the behavior of complex systems. Splash loosely couples models via data exchange, where each model often produces or processes time series having huge numbers of data time points and many data values per data time point. If the time-series output of one "source" model is used as input for another "target" model and if the time ticks for the source data are irregular, the source and target time ticks do not match up, or the time granularity of the source is coarser than that of the target, an interpolation operation is required.

In one embodiment, as will be discussed, cubic-spline interpolation is used in an environment processing massive time series, for which parallel processing techniques are needed. In this embodiment, an algorithm is introduced that can be based on a stochastic gradient descent (SGD) technique. Two alternate embodiments are then introduced to provide for a distributed stochastic gradient descent (DSGD) algorithm, applied at times to low-rank matrix factorization functions. Furthermore, in a different embodiment, an alternate distributed stochastic gradient descent (ADSGD) can be used. All of these embodiments allow efficient shared-nothing parallel processing of tasks in calculating the cubic-spline interpolation function using SGD which is not provided currently. Particularly, in one embodiment, DSGD is used to calculate the coefficients that appear in the cubic-spline interpolation formula by solving a massive tridiagonal system of linear equations. The techniques used for spline interpolation in this embodiment can be equally applicable to provide a parallel solution for diagonal linear systems in other massively parallel data-integration and data-analysis applications. These techniques are particularly well suited for MapReduce processing, which is explained next.

In a shared-nothing parallel processing environment, such as a cluster of computers, processing units and their associated memories are mutually disjoint, and all communication between processors occurs over a network. In one embodiment, MapReduce function can be used to organize the shared-nothing parallel processing, further enhancing interpolation and composite simulation modeling. MapReduce is referred to as a popular programming model for processing large data sets. MapReduce can be used to organize distributed computing on shared-nothing clusters of computers. When parallelizing SGD by means of DSGD and ADSGD, MapReduce can be a very helpful tool. In addition, MapReduce libraries have been written in many programming languages and can be used in different platforms. A popular implementation of the MapReduce function is the Hadoop programming environment, which is referred to throughout for ease of discussion. However, Hadoop is only used as an example with the understanding that others can be used in alternate embodiments. The SGD application as discussed above enabled for parallel processing can be used by taking advantage of Hadoop. An example of this is illustrated in conjunction with FIGS. 3-5. As will be discussed later, a nonstandard version of the InputFormat function of Hadoop is used to create logical splits in data to enable processing. This eliminates the massive shuffling of data over a network that occurs during the Reduce phase of a MapReduce job, and allows DSGD and ADSGD embodiments to handle the processing using Map-only jobs that incur minimal data transfer.

Returning to the exemplary Splash system, in FIG. 1, a module component manager 120 collects information from a variety of different locations. The module component manager 120 is in processing communication and has access to one or more preexisting individual models and datasets, collectively shown and referenced in FIG. 1 as 110. The module component manager 120 also acquires information from other sources such as directly from a user. This may include information that is required by the module component manager 120 at time of a first usage. This can be achievable, for example, through registration in an embodiment using Splash. Models and data must be registered with Splash before these models can be used to create Splash model actors and Splash data actors. These "actors" are components of Splash that encapsulate the framework's knowledge about the various models and data sources. In one embodiment, this can be specified via metadata files that are created by the system as part of a registration process.

Other data management and tools such as visualization tools, directories, experimental data managers, and model execution mangers are also accessible to the module component manger 120 and can be provided as part of the information relating to this component (120). The module component manager 120 is also in processing communication with a repository 130. The repository 130 can include a plurality of data and other related descriptions as appropriate and include a plurality of storage and memory devices.

One problem of providing seamless data transformation between models occurs when time-series output of one model needs to be used as input of another. When there is a mismatch between the time points (also called time ticks) output by the first model and those expected by the second model, a time-alignment transformation is needed. Time alignment refers to the general process of transforming a "source" time series based on one set of time points to a "target" time series based on a different set of points. When dealing with data integration, especially of different simulation models, it is important that data from different sources are transformed in a way such that all of the transformed data sets represent observations at a specified target set of points. In the setting of composite simulation modeling, the source data sets typically represent the output of upstream component models and perhaps additional datasets generated by real-world processes, and the target data set represents the input to a downstream simulation model. The time-alignment transformations are needed for the data from the upstream models to be used by the downstream model. This is especially important because in many dynamic simulation models, such as those used combined using Splash, much of the data produced and consumed by the models take the form of time series. The number of time points in a dataset may be massive when the dataset represents the simulated behavior of a complex system over a long time period using a simulation model with high time resolution. It is for this reason that it is important to understand the need for interpolation in conjunction with handling massive time series data.

In general, the required time-alignment transformation between a source and target dataset depends on the relative granularity of the source and target time points, as well as whether the source data corresponds to an instant measure, a cumulative measure since the last source tick, or a cumulative measure since some specified time point (such the start of a simulated time period). For example, suppose that a source model outputs a set of instantaneous measurements (such as body weight) once every two simulated days, whereas the target model expects input once per simulated day. Then a data interpolation is needed; e.g., if a person weighs 60 kg on day 2 and 62 kg on day 4, then a reasonable estimate of their weight on day 3 is 61 kg. Other data, such as the amount of protein purchased over a two day interval, must be allocated between days; e.g., if a simulated person shops daily and purchases a total of 300 g of protein over days 2 and 3, then they may reasonably be estimated to purchase 150 g of protein on each of these days. (If the situation were reversed, with the buying-and-eating model producing data every simulated day and the BMI model expecting data once every two days, then a time alignment would involve aggregating the data values: weight over a two day interval might be obtained by averaging a pair of daily weights, and total protein purchased over a two day interval would be obtained by summing the daily purchased quantities.).

In one embodiment a time-aligner module detects time mismatches from metadata on the source and target dataset (e.g., regularity or irregularity of time ticks and tick frequency), and then provides an extensible graphical user interface (GUI) to assist users in designing appropriate time-alignment transformations as desired. Metadata about the source and target time-series characteristics (instantaneous measurements, cumulative measurements, and so on) are also used to determine the type of time alignment needed (interpolation, allocation, aggregation, and so on), so that for each data attribute in the source time series the user is offered a menu of time alignments of the appropriate type from which to select. In the exemplary Splash system, the metadata are represented in the Splash Actor Description Language (SADL).

Figure 2:
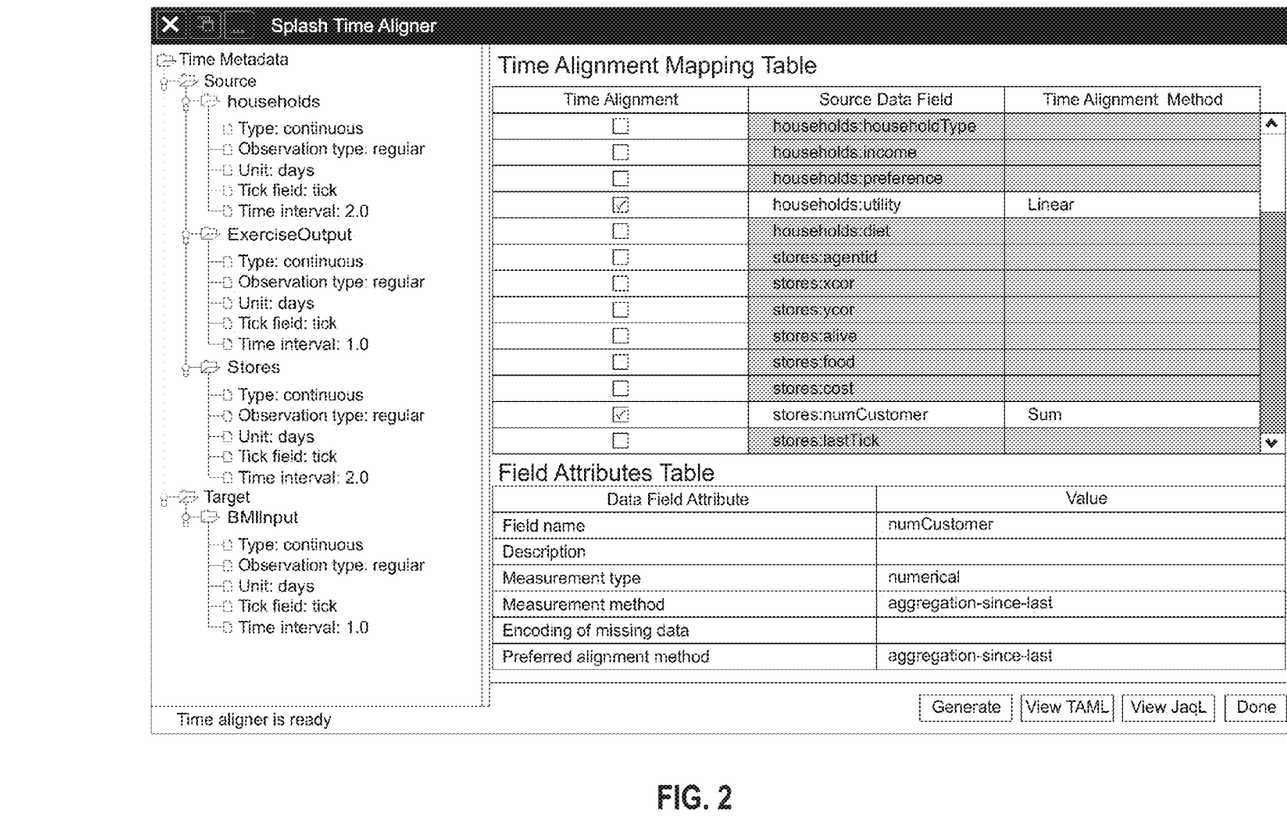
FIG. 2 depicts a screen shot illustrating a graphic user interface (GUI) screen for design of time-alignment transformations used in Splash in accordance with an exemplary embodiment.

FIG. 2 provides a screen shot of an exemplary GUI used in Splash to help users design an appropriate time alignment. The leftmost panel displays the time-series characteristics of the source and target datasets, and the right top panel allows the user to select an appropriate time-alignment method for each data item in each source time series.

In one embodiment, high-level internal specifications of time-alignment transformations created in the GUI are then stored using a special language that allows for future modification or re-use. This language is called in one embodiment as Time-Alignment Markup Language or TAML. TAML can specify a broad variety of time alignments.

The time-aligner module enables, in one embodiment, for a code-generation algorithm to compile an internal high-level TAML representation of a desired time alignment into runtime code that is executed by a Splash "mapper actor" during a simulation run of the composite simulation model. The code-generation algorithm can be based on a windowing paradigm that produces highly parallelizable runtime code from a TAML specification.

Another important concept besides time-alignment for transformation of data across platforms is the notion of structural transformations, also called schema mappings. The latter type of mapping serves to align the schemas, i.e., formats, of the data at each time tick. Thus a schema mapping determines the format of the data at each time tick, whereas a time alignment deals with mismatches in the frequency of source and target time ticks. Splash uses Clio++, an enhanced version of the Clio data integration tool, to let a user semi-automatically design a structural transformation. Clio stands for command line language interface operator and is a system for expressing declarative schema mappings. Clio is an IBM® mapping technology and provides a declarative way of specifying schema mappings between either XML or relational schemas. Mappings are represented in a high-level language called XSML that captures the transformation semantics of the mappings, analogously to the way in which time alignments are represented in a high-level TAML representation. The XSML representation can then be used to generate runtime code in languages such as SQL, XQuery, or JAQL, depending on the kind of schemas and systems involved in the mapping. Clio and similar tools have primarily been developed in the context of data warehousing, where the goal is typically to combine disparate data sources into a common format. Clio++ extends the Clio system to automatically handle measurement-unit mismatches, such as between pounds and kilograms. Clio++ provides many advantages when used with simulation and therefore is used in describing some of the embodiments herein. However, other schema mapping and data transformation tools can be used in alternate embodiments as can be appreciated by those skilled in the art.

The exemplary Splash system first performs a time-alignment transformation (if needed) followed by a structural transformation (if needed). In general, these two types of transformation are orthogonal, so that they can be performed in any order, and can potentially be performed simultaneously to minimize the number of passes over the data. Scalable methods are needed for both kinds of data transformations, because the amount of data produced by the program can be massive when simulating large, complex systems, especially when the time dimension is modeled at high resolution over long time periods.

Returning to the problem of time alignment, a common and important scenario occurs when either the time ticks of a source time series are irregular, the source and target time ticks do not match up, or the time granularity of the source is coarser than that of the target. Interpolation needs to be used then to resolve the problem. Interpolation provides a means of imputing missing or hard-to-calculate data values when the values are generated by an unknown underlying function. A number of different interpolation techniques can be used, and there are considerations and specific needs that may drive choosing one method of interpolation over others. Some of these concerns include the level of accuracy needed, the number of data points to be generated and the speed and amount of time that is to be dedicated to generating the data points using interpolation.

A simple interpolation method that can be used is the "nearest-neighbor" or proximal interpolation method. In this method, an algorithm computes the value at a target point as simply the value of a nearest point, yielding a piecewise-constant interpolant. Linear interpolation is another interpolation method. In linear interpolation an algorithm computes the value at a target point as a distance-weighted average of the existing data points on either side, yielding a piecewise linear interpolant, visually, a line graph. The foregoing methodologies discussed create usable data but often have a relatively high degree of approximation error for both the function values and their derivatives at intermediate points. A more complex, yet more accurate method of interpolation is spline interpolation.

In linear interpolation, the algorithm uses a linear interpolating function for each of the missing-data intervals. By contrast, spline interpolation uses low-degree polynomials in each of these intervals, and chooses the polynomial pieces such that they fit together more smoothly. The resulting function is called a spline. Spline interpolation comes in different varieties. For example, a natural cubic spline is an algorithm that uses piecewise cubic and twice continuously differentiable functions for the intervals. Furthermore, a second derivative is zero at the end points. Scalable methods are needed for such data transformations, because the amount of data produced by a simulation program can be massive when simulating large, complex systems over long time periods, especially when the time dimension is modeled at high resolution.

In an example, the source model outputs hourly temperatures and the target model needs temperatures every 15 minutes. In this example, a time-series interpolation operation is required. Cubic spline interpolation is desirable in this example because of its smoothness properties. For example, a cubic spline can be shown to approximate a function f and its derivative f' with absolute errors of at most $h^{3/2}(\int f''(x)^2 dx)^{1/2}$ and $h^{1/2}(\int f''(x)^2 dx)^{1/2}$ at any time point as h decreases to 0, where h is the maximum distance between successive source time ticks.

This result assumes only that f is twice continuously differentiable; if $f^{(4)}$ exists and is continuous and the source data ticks are uniformly spaced, then an error bound of $O(h^4)$ can be established. There are challenges in solving the problem of cubic-spline interpolation over massive time series in a MapReduce environment. This is due to the fact that scalable cubic-spline interpolation is needed in data integration and composite simulation modeling.

One challenge in cubic-spline interpolation is that a large-scale tridiagonal linear system Ax=b must first be solved so as to compute a set of "spline constants" that appear in the interpolation formula. A large literature exists on scalable cubic-spline interpolation and scalable solution of tridiagonal systems. Some of these algorithms impose requirements that are unreasonable or overly stringent, such as that the source observations be equally spaced or that the inverse of the massive matrix A be (somehow) already computed. Most of the remaining algorithms focus primarily on vector machines, general processor units (GPUs), or message-passing parallel architectures (i.e., MPI). When implemented on a MapReduce platform, the algorithms require large communication overheads that become resource prohibitive especially when data shuffling is required between mappers and reducers.

An example will now be used to enable better understanding of the time-alignment problem to be resolved and of embodiments that are used to solve it. In the example, a source dataset comprising the time series is represented as a sequence $S=\{(s_0, d_0); (s_1, d_1), \ldots (s_m, d_m)\}$ where $s_i$ is the time of the ith observation and $d_i$ is the associated data observed at time $s_i$. Each $d_i$ can be viewed as a k-tuple for some k equal or larger than 1. The "ticks", or indices, run from 0 to m. Similarly, a target dataset can be represented as:

$$T=\langle (t_0,\tilde{d}_0),(t_1,\tilde{d}_1),\ldots,(t_n,\tilde{d}_n)\rangle.$$

It is assumed that the source time points are strictly increasing and represented as $s_0 < s_1 < \ldots < s_m$. Moreover, the target time points are required to be evenly spaced and start from simulated time 0, so that $t_i = i\Delta$ for some $\Delta > 0$ and i belonging to the set $\{0, 1, \ldots n\}$. This is usually the case in practice and if there are no requirements at all on the target time points, then no time alignment is needed, and there is usually no natural way to define target time points at irregular intervals. For this example, no loss of generality is entailed by assuming that $t_0 = 0$, since otherwise the data can be uniformly shifted along the time axis. It is assumed that there are no invalid or missing source data values, i.e., it is assumed that any such values have been fixed or imputed prior to the time-alignment step. To ease understanding and for simplicity, it is assumed that $s_0 = t_0$ and $s_m = t_n$ so that the source data completely spans the target-data interval.

In one embodiment, all time-alignment operations can be viewed as applying an "alignment function" over a "window". Specifically, suppose the target data value need to be computed for a value of $d_i$ at target time $t_i$ for some $$i \in \{1, 2, \ldots, n\}$$

The window $W_i$ for $t_i$ is then simply a subsequence of S that contains the information needed to perform the computation. Often, the window has the form $$W_i=\langle (s_j,d_j),(s_{j+1},d_{j+1}),\ldots,(s_{j+k},d_{j+k})\rangle, \text{ where}$$
$$s_j \leq t_i \leq s_{j+k}$$

so that the window comprises data observed at contiguous times points of S that span the target time point $t_i$. If the window width $|W_i|$—that is, the number of pairs in $W_i$—is the same for each $t_i$, then the sequence of windows behaves as a sliding window over S. The window may progress in "bursts" in that:

$$W_{i-1} \neq W_i = W_{i+1} = \ldots = W_{i+l_i} \neq W_{i+l_i+1}$$

for one or more values of i, since a given set of source data points might suffice for computing multiple target data points. The desired aligned data $\tilde{d}_x$ is computed by applying an appropriate alignment function to the data in $W_i$. The advantage to this windowing paradigm is that the windows, once created, can then be processed independently and in parallel, and then the results can be merged to form the time-aligned target dataset.

Since cubic-spline interpolation is the most desired and difficult type of interpolation, the discussion relating to the embodiments of solving time alignment problems will be discussed in conjunction with it but as can be appreciated other types of alignment functions can also be used within the windowing paradigm. In fact, as can be appreciated by those skilled in the art, any type of alignment functions that can capture interpolation, as well as aggregation and allocation (when each data point represents a total since a last time tick), can be used.

In one embodiment, for simplicity, it is assumed that each source-data observation $d_i$ comprises a single attribute value. In principle, an alignment procedure needs to be performed separately for each attribute. In practice, multiple alignment operations might be performed during a single scan over the source data. The most common type of interpolation to be used in this embodiment can be piecewise linear interpolation and natural cubic-spline interpolation. In this case, a linear interpolation window can be defined as $$W_i=\langle (s_j,d_j),(s_{j+1},d_{j+1})\rangle, \text{ where } j=\max\{n:s_n \leq t_i\}, \text{ and}$$
$$s_j < t_i < s_{i+1}.$$

Then the alignment function computes the interpolated data value as:

$$\tilde{d}_i = d_j + \frac{t_i - s_j}{s_{j+1} - s_j}(d_{j+1} - d_j).$$

Cubic splines are more complex, but have better smoothness properties. The idea is to define a function d(x) such that (1) $d(s_j)=d_j$ for each j, (2) d is a cubic polynomial over each interval $[s_j, s_{j+1}]$, and (3) the second derivative d" exists and is continuous throughout the interval $[s_0, s_m]$. For natural cubic splines, there is an additional requirement that $d"(s_0)=d"(s_m)=0$, so that the interpolating function looks like a straight line to the left and right of $[s_0, s_m]$. Given such a function, the interpolated target value $\tilde{d}_i$ at time $t_i$ is given as:

$\tilde{d}_i = d(t_i)$. In more detail, set $h_j = s_{j+1} - s_j$ for $0 \le j \le m-1$,
and let $x=(x_1, x_2, \ldots, x_{m-1})$ be the solution to the linear system Ax=b, where A and b are given below:

$$A = \begin{bmatrix} \frac{h_0 + h_1}{3} & \frac{h_2}{6} & 0 & \cdots & 0 & 0 & 0 \\ \frac{h_1}{6} & \frac{h_1 + h_2}{3} & \frac{h_2}{6} & \cdots & 0 & 0 & 0 \\ \vdots & \vdots & \vdots & \ddots & \vdots & \vdots & \vdots \\ 0 & 0 & 0 & \cdots & \frac{h_{m-3}}{6} & \frac{h_{m-3} + h_{m-2}}{3} & \frac{h_{m-2}}{6} \\ 0 & 0 & 0 & \cdots & 0 & \frac{h_{m-2}}{6} & \frac{h_{m-2} + h_{m-1}}{3} \end{bmatrix}$$

$$b = \begin{bmatrix} \frac{d_2 - d_1}{h_1} - \frac{d_1 - d_0}{h_0} \\ \frac{d_3 - d_2}{h_2} - \frac{d_2 - d_1}{h_1} \\ \vdots \\ \frac{d_m - d_{m-1}}{h_{m-1}} - \frac{d_{m-1} - d_{m-2}}{h_{m-2}} \end{bmatrix}.$$

Define $\sigma_0 = \sigma_m = 0$ and $\sigma_j = x_j$ for $1 \le j \le m-1$. Then for a window $W_i$ the window can be set as $W_i = \langle (s_j, d_j), (s_{j+1}, d_{j+1}) \rangle$. This is exactly as it was defined for the piecewise linear interpolation, but the alignment function now computes the interpolated data value as:

$$\tilde{d}_i = \frac{\sigma_j}{6h_j}(s_{j+1} - t_s)^3 + \frac{\sigma_{j+1}}{6h_j}(t_i - s_j)^3 + \left(\frac{d_{j+1}}{h_j} - \frac{\sigma_{j+1} h_j}{6}\right)(t_i - s_j) + \left(\frac{d_j}{h_j} - \frac{\sigma_j h_j}{6}\right)(s_{j+1} - t_i).$$

The $\sigma_j$ values are computed in a preprocessing step as will be discussed. Note that the information in the window $W_i$ defined for cubic-spline and linear interpolation in the previous discussion is not quite enough to compute the interpolated value $\tilde{d}_i$ because one also needs the quantities $\sigma j$ and $\sigma_{j+1}$. This can still fit within the time-alignment windowing scheme discussed previously, because each source tuple $d_j$ is appending $\sigma_j$ as a new attribute. It should be assumed that $\sigma_j$s have been appended in this manner. Then the interpolated target values can be computed in a completely distributed manner, since the $W_i$ windows can be processed in parallel to produce tuples of the form $(t_i, \tilde{d}_i)$.

After all such tuples are produced, a parallel sort by $t_i$ value can be used to construct the final target time series. As noted previously, a given window $W_i$ corresponding to successive source time points $s_j$ and $s_{j+1}$ can produce multiple pairs of $(t_i, \tilde{d}_i)$ if multiple target time points lie in the interval $[s_j, s_{j+1}]$.

The remaining concern is then to compute the spline constants $\sigma_j$ in a distributed fashion in a function such as MapReduce. As discussed previously, to compute the spline constant $\sigma_j$ and spline parameters, the linear system Ax=b, consisting of m equations, must be solved in a distributed manner.

In one embodiment, the system of m unknowns is partitioned into two systems of m=2 unknowns. This partitioning continues recursively, ultimately yielding $\log_2$ m systems of two unknowns, which are then solved. In a MapReduce setting, this algorithm requires $\log_2$ m map and reducejobs, with expensive many-to-many communication occurring over the network during each data shuffling phase.

In an alternative, preferred embodiment as will be discussed in conjunction with this example, the distributed stochastic gradient descent (DSGD) algorithm for distributed low-rank matrix factorization is adapted to compute spline constants by solving the system Ax=b. This embodiment is well suited for MapReduce architectures. In one embodiment, a suitable modification of a usual Hadoop InputFormat operator is used as an example to show an implementation technique that organizes the required computations as a sequence of map-only jobs, to minimize network communication needed. These techniques are applicable to both spline interpolation problems and solution of k-diagonal and block-diagonal systems in other contexts and can be Splash independent. The technique is also complementary to a broad class of time and geospatial transformations for scientific datasets.

For the formulation as an SGD problem, the first step is to recast the problem as a minimization problem.

Set $L_i(x) = (A_i . x - b_i)^2$ for $1 \le i \le m-1$, where $A_i$ denotes the ith row of the $(m-1) \times (m-1)$ matrix A.

Solving the system Ax=B is equivalent to minimizing the function $L(x) = L_1(x) + \ldots + L_{m-1}(x).$ In the time-alignment setting, such approximate solutions can be tolerated to yield values of L that are close, but not exactly equal, to the minimum possible value. Such slight deviations from the optimal solution merely cause a slight decrease in smoothness in the cubic-spline interpolation function. This suggests the use of an iterative gradient descent procedure that starts with an initial value $x^{(0)}$ and repeatedly takes "downhill" steps that decrease the value of L, using the recursion $$x^{(n+1)} = x^{(n)} - \epsilon_n \nabla L(x^{(n)}). \tag{1}$$

Here $\{\epsilon_n\}$ is a sequence of decreasing step sizes and $\nabla L$ is the gradient of L with respect to x, so that $-\nabla L(x)$ represents the direction of maximum decrease in L, starting from point x. The step sizes must decrease in order to allow convergence to a solution, but must decrease slowly enough so that the algorithm does not get stuck at a solution far from the optimum. Therefore, a typical sequence is of the form:

$\epsilon_n = n^{-\alpha}$ for some $\alpha \in (0.5, 1]$.

When the matrix A is tridiagonal, as in the cubic-spline setting, a good first approximation $x^{(0)}$ can be obtained by simply ignoring the off-diagonal terms in the matrix A and solving the resulting diagonal system to obtain $$x_i^{(0)} = \frac{3}{h_{i-1} + h_i}\left(\frac{d_{i+1} - d_i}{h_i} - \frac{d_i - d_{i-1}}{h_{i-1}}\right)$$

for $$1 \le i \le m-1.$$

The inverse matrix $A^{-1}$ tends to be "diagonally dominant" in that the magnitude of the matrix entries decreases exponentially with distance from the main diagonal. Ignoring off-diagonal entries therefore yields a reasonable first approximation. For this specific function L, $$\nabla L(x) = \sum_{i=1}^{m-1} \nabla L_i(x) \quad (2)$$

by the linearity of the gradient operator. The $a_{i,j}$ is denoted as the (i,j)th component of A and $b_i$ is denoted as the ith component of b, so that:

$$b_i = \frac{d_{i+1} - d_i}{h_i} - \frac{d_i - d_{i-1}}{h_{i-1}} \quad (3)$$

and $$a_{i,j} = \begin{cases} h_{i-1}/6 & \text{if } j = i-1 \\ (h_{i-1} + h_i)/3 & \text{if } j = i \\ h_i/6 & \text{if } j = i+1 \\ 0 & \text{otherwise.} \end{cases} \quad (4)$$

For convenience, $x_0 = x_m = 0$ and $a_{i,j} = 0$ if $$i \notin \{1,2,\ldots,m-1\} \text{ or } j \notin \{1,2,\ldots,m-1\}.$$

Then the jth component of the ith partial gradient is given by $$\nabla_j L_x(x) = \nabla_j (A_i, x - b_i)^2 \quad (5)$$
$$= \nabla_j \left(\sum_{k=1}^{m-1} a_{i,k} x_k - b_i\right)^2$$
$$= \begin{cases} u_{i,j} & \text{if } i-1 \le j \le i+1 \\ 0 & \text{otherwise.} \end{cases}$$

where $$u_{i,j} = 2a_{i,j}(a_{i,j-1}x_{i-1} + a_{i,i}x_i + a_{i,i+1}x_{i+1} - b_i).$$

Because the gradient $\nabla L$ can be expressed as a sum of partial gradients as in (2), in one embodiment, called deterministic gradient descent (DGD), the gradient descent procedure is parallelized in a MapReduce environment by partitioning the data across processing nodes. Each node sums up the partial gradients for its part of the data, and the partial gradients are then aggregated at the reducers. This can be done conveniently by using a query language on top of MapReduce. Once the gradient has been computed, a master node will perform the update of the parameter values using a well-known updating formula such as L-BFGS-B.

In an embodiment, a stochastic gradient descent (SGD) approach is used in place of DGD. The SGD algorithm is identical to standard gradient descent, but instead of computing a gradient $\nabla L(x)$ as a sum of m−1 terms of the form $\nabla L_i(x)$ the sum is approximated by choosing a value of i at random, and then scaling up the partial gradient by a factor of m−1. That is $\nabla L(x)$ is approximated at the nth step by:

$$Y_n(x) = (m-1)\nabla L_{\alpha(n)}(x), \text{ where each } \alpha(n)$$

is sampled randomly and uniformly from the set $\{1, 2, \ldots, m-1\}$. Thus each $Y_n$ is random, but equal to $\nabla\nabla L$ in expectation. The recursion is now stochastic, and is given by:

$$x^{(n+1)} = x^{(n)} - \epsilon_n Y_n(x^{(n)}).$$

The averaging operation that is implicit in this stochastic recursion has the effect of smoothing out the gradient estimates over time, so that the algorithm converges to a good solution. In one embodiment, the random sequence $\{x^{(n)}\}$ converges to the optimal solution x* with probability 1 as $n \to \infty$.

One challenge with the SGD algorithm is that the algorithm is purely sequential, and so does not lend itself to a MapReduce implementation. Therefore, SGD now needs to be distributed in the cubic-spline setting.

A "stratified" version of stochastic gradient descent, called SSGD is now introduced. For simplicity of explanation, it is assumed that m−1 is divisible by 3, so as to define the following strata:

$$U^1 = \{1,4,7,\ldots,m-3\}$$

$$U^2 = \{2,5,8,\ldots,m-2\}$$

$$U^3 = \{3,6,9,\ldots,m-1\}$$

$$L^s(x) = 3\Sigma_{i \in U^s} L_i(x) \text{ for } s=1,2,3$$

so that $L(x) = (\frac{1}{3})L^1(x) + (\frac{1}{3})L^2(x) + (\frac{1}{3})L^3(x)$.

$L^1$, $L^2$, and $L^3$ are referred to as stratum loss functions. SSGD proceeds in a manner similar to ordinary SGD but, at each iteration, the algorithm takes a downhill step with respect to one of the stratum losses $L^s$, i.e., approximately in the direction of the negative gradient $-\nabla L^s(x)$.

Although each such direction is "wrong" with respect to minimization of the overall loss L, SSGD will converge (under appropriate regularity conditions) to a good solution for L if the sequence of strata is chosen "carefully", which means roughly that over many steps the three strata will be chosen equally often. The motivation for SSGD is that, as discussed in the sequel, the SGD algorithm can be run in a highly parallel manner within each of the three strata.

To develop SSGD, suppose that there is a (potentially random) stratum sequence $\{\gamma_n\}$, where each $\gamma_n$ takes values in $\{1,2,3\}$ and determines the stratum to use in the nth iteration. The rule can now be updated using a noisy observation $Y_n$ of the gradient $\nabla L^{\gamma n}(x^{(n)})$ $$x^{(n+1)} = x^{(n)} - \epsilon_n Y_n. \quad (6)$$

Here $Y_n = (m-1)\nabla L_{\alpha(n)}(x^{(n)})$, where $\alpha(n)$
is sampled randomly and uniformly from U. The stratum size is (m−1)/3 and the) partial gradient term is $3\nabla L_{\alpha(n)}(x^{(n)})$,
The factor of 3 cancels out. The assumption on the stratum sequence $\{\gamma n\}$ is that it is regenerative in that there exists an increasing sequence of almost-surely finite random indices $$0 = \beta(0) < \beta(1) < \beta(2) < \ldots \text{ that serves to decompose } \{\gamma_n\}$$

into consecutive, independent and identically distributed (i.i.d.) cycles $\{C_k\}$, with $$C_k = \{\gamma_{\beta(k-1)}, \gamma_{\beta(k-1)+1}, \ldots, \gamma_{\beta(k)-1}\} \text{ for } k \ge 1.$$

At each $\beta(i)$ the stratum is selected according to a probability distribution that is independent of past selections, and the future sequence of selections after step $\beta(i)$ looks probabilistically identical to the sequence of selections after step $\beta(0)$.

The length $\tau_k$ of the kth cycle is given by $\tau_k = \beta(k) - \beta(k-1)$. Letting $L_{\gamma n=s}$ be the indicator variable for the event that stratum s is chosen in the nth step, set $$tX_k(s) = \sum_{n=\beta(k-1)}^{\beta(k)-1} (I_{\gamma n=s} - (1/3)) \text{ for } s=1,2,3$$

It follows from the regenerative property that the pairs $\{(X_k(s), \tau_k)\}$ are independent and identically distributed (i.i.d.) for each s.

THEOREM 1.1—Suppose that A is non-singular, so that the system Ax=b has a unique solution x*. Also suppose that $$\epsilon_n = O(n^{-\alpha}) \text{ for some } \alpha \in (0.5, 1], \qquad (i)$$

$$(\epsilon_n - \epsilon_{n+1})/\epsilon_n = O(\epsilon_n). \qquad (ii)$$

and $$\{\gamma_n\} \text{ is regenerative with } E[\tau_1^{1/\alpha}] < \infty \text{ and } E[X_1(s)] = 0 \qquad (iii)$$

for s=1, 2, 3. Then the sequence $\{x^{(n)}\}$ defined by (6) converges to $x^*$ with probability 1.

Thus, under regularity conditions, one may pick any regenerative sequence $\{\gamma_n\}$ such that $E[X_1(s)]=0$ for all strata. The condition $E[X_1(s)]=0$ essentially requires that, for each stratum s, the expected fraction of visits to s in a cycle equals ⅓. By the strong law of large numbers for regenerative processes, this condition—in the presence of the finite-moment condition on $\Sigma_1$—is equivalent to requiring that the long-term fraction of visits to each stratum equals ⅓. The finite-moment condition is satisfied for schemes in which the number of successive steps taken within a stratum is bounded with probability 1, as is typically the case, e.g., when $\epsilon_n = 1/n$ or when $\epsilon_n = 1/\lceil n/k \rceil$ for some k>1 with $\lceil x \rceil$ denoting the smallest integer greater than or equal to x, so that the step size remains constant for some fixed number of steps. Similarly, a wide variety of strata-selection schemes satisfy the conditions of the theorem. Examples include (1) running precisely c/3 steps on stratum s in every "chunk" of c steps, and (2) repeatedly picking a stratum according to some fixed distribution $\{p_s > 0\}$ and running $$c/(3p_s)$$

steps on the selected stratum s. Certain schemes in which the number of steps per stratum is random are also covered by Theorem 1.1.

The DSGD algorithm for solving the system Ax=b is now explained. The DSGD algorithm follows from the SSGD algorithm previously described, by executing the SSGD algorithm and also running SGD in a highly parallel manner within each stratum. As before, assume that m−1 is divisible by 3, and suppose that there is a d-node shared-nothing environment such as MapReduce. Again for simplicity, assume that d divides m−1 and set r=(m−1)/d; assume that r is greater than or equal to 3. To distribute the matrix A and vector b only once across the d nodes, the node q receives the coefficients $\{\alpha_{i,j} : r(q-1) \leq i \leq rq \text{ and } i-1 \leq j \leq i+1\}$ and $b_{r(q-1)+1}, b_{r(q-1)+2}, \ldots, b_{rq}$.

Whereas most $a_{i,j}$ coefficients appear at a unique node, some "boundary" coefficients appear at two successive nodes.

The individual steps in DSGD are grouped into sub-epochs, each of which amounts to processing one of the strata. One can then define an epoch to comprise a sequence of three sub-epochs. In more detail, DSGD makes use of a sequence $\{(\xi_k, T_k)\}$, where $\xi_k$ denotes the stratum selector used in the kth sub-epoch, and $T_k$ the number of steps to run on the selected stratum. Note that this sequence of pairs uniquely determines an SSGD stratum sequence as before.

$$\gamma_1 = \cdots = \gamma_{T_1} = \xi_1, \gamma_{T_1+1} = \cdots = \gamma_{T_1+T_2} = \xi_2,$$

The sequence $$\{(\xi_k, T_k)\}$$

is chosen is chosen such that the underlying SSGD algorithm, and hence the DSGD algorithm, is guaranteed to converge. Once a stratum $\xi_k$ has been selected, $T_k$ SGD steps can be performed on $U^{\xi_k}$ in a parallel and distributed manner, as follows.

Suppose that $\xi_1 = 1$ so that $T_1$ steps of the SGD algorithm are run on stratum s=1. $X^{(0)}$ is distributed across the d nodes, with node q receiving components $$x_{r(q-1)}^{(0)}, x_{r(q-1)+1}^{(0)}, \ldots, x_{rq-1}^{(0)};$$

Node d receives the additional component $x_{m-1}^{(0)}$

In one embodiment, the nth SGD step at a node q randomly selects an index, say, i and then updates $x^{(n)}$ by adding the term $$-\epsilon Y_n = -\epsilon(m-1) \nabla L_i(x^{(n)})$$

Figure 3:
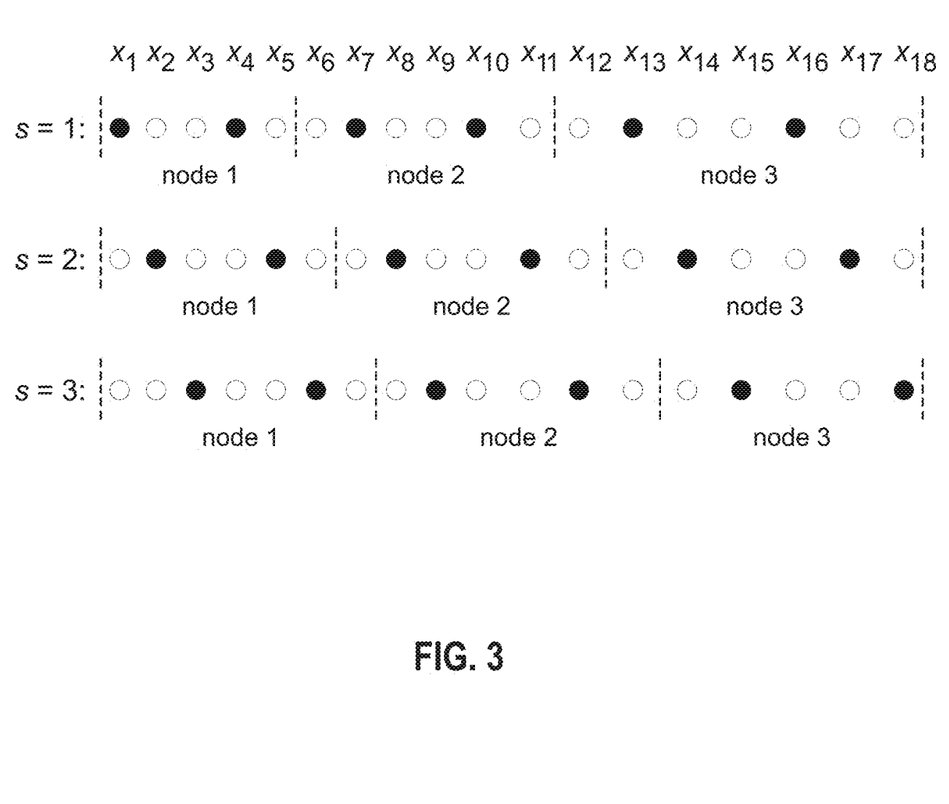
FIG. 3 depicts a graphical representation of a plurality of stratum elements with node assignments in accordance with an embodiment.

The only affected components are $x_{i-1}^{(n)}$, $x_i^{(n)}$ and $x_{i+1}^{(n)}$ which are located at node q by design. The coefficients of A and b needed to compute the update also reside at node q. The updates for different stratum elements have completely disjoint effects. FIG. 3 provides an example. Referring to the figure, suppose that SGD is run in stratum 1 and that the first four random elements selected are $x_7$, $x_4$, $x_{10}$, and $x_{12}$. The update obtained by the addition of $-\epsilon(m+1) \nabla L_1(x_7)$ to x affects only elements $x_6$, $x_7$, and $x_8$. The update based on $x_4$ only affects $x_3$, $x_4$, and $x_5$. These two updates, and indeed all four updates, can thus be applied in any order. More generally, we obtain the same result after $T_1$ SGD steps in stratum 1 either by executing the $T_1$ steps in sequence or by executing the steps at the different nodes independently and in parallel and simply summing the updates. For the stratification scheme depicted in FIG. 3, SGD updates can in fact be applied within a node in arbitrary order. Thus, if the sequential algorithm chooses components in $U^1$ at random, one can correctly "simulate" the algorithm by first generating a random vector W≈Multinomial($T_1$, (1/d, 1/d, . . . , 1/d)) to determine the number of samples to take at each node; then, in parallel at each node q, a sample of $W_q$ components can be drawn with replacement and process updates corresponding to these components in arbitrary order. The computation of $W_q$ can be performed in a distributed manner by specifying a pseudo-random number generator (PRNG) and running an independent instance of the PRNG at each node, with all PRNGs initialized using the same pseudorandom number seed. In an even simpler embodiment, every element in stratum 1 is sampled exactly once. Elements are selected according to a sequence that is randomly and uniformly selected from among all possible sequences, where $n_i$ is the number of elements at node i that belong to stratum 1. This approach balances randomness with thorough coverage of the elements in the stratum, and was found to work well in the setting of matrix factorization. The SGD algorithm is run on the other two strata in an analogous manner, with a slight reshuffling of the data required at each change of stratum. If, for example, $T_1$ SGD steps were taken (in parallel) on stratum 1, and the algorithm next decides to take $T_2$ steps on stratum 2, each node q>1 needs to transmit the leftmost component $x_{r(q-1)}^{(T_1)}$ to node (q−1).

After such a transfer, each node q now contains the components $x_{r(q-1)+1}^{(T_1)}, x_{r(q-1)+2}^{(T_1)}, \ldots, x_{rq}^{(T_1)}$ Similar data transfers are required at each sub-epoch. As discussed, in one embodiment the Hadoop implementation of DSGD can be used to "hide" these transfers within the standard initialization processing for a map job, minimizing network traffic.

The foregoing description assumed for ease of explanation that the step size is fixed during each sub-epoch. One skilled in the art can appreciate that the step size can be allowed to change at each step, with a concomitant increasing in book keeping complexity and random number synchronization.

Analogously to the desire to trade randomness and thoroughness when running SGD within a stratum, one may also decide to trade off these two factors when selecting the strata themselves. At one end of the spectrum, the strata can be visited randomly, such as in an i.i.d. manner, so that the sequence $\{\xi k\}$ is i.i.d. In this case, the start of each sub-epoch corresponds to a regeneration point, so that Theorem 1.1 applies and convergence is assured. In a preferred embodiment, the algorithm systematically visits each of the three strata during each epoch. The sequence in which to visit the strata is chosen at random from the set of the 3!=6 possible sequences. In this case, the regeneration points correspond to the epochs rather than the sub-epochs. As with the previous intra-stratum sampling scheme, this latter approach was found to work well in the setting of matrix factorization.

In an alternate embodiment an "Alternative DSGD Algorithm (ADSGD)" can be computed. In this alternate embodiment, the ADSGD can be used by choosing a different set of strata. As before, assume that m−1 is divisible by 3, and that there are d nodes, where d divides m−1. Set r=(m−1)/d and $$U^1 = \bigcup_{q=1}^{d} \{r(q-1)+1, r(q-1)+2, \ldots, rq-2\}$$

$$U^2 = \bigcup_{q=1}^{d} \{r(q-1)+2, r(q-1)+3, \ldots, rq-1\}$$

$$U^3 = \bigcup_{q=1}^{d} \{r(q-1)+3, r(q-1)+4, \ldots, rq\}.$$

Figure 4:
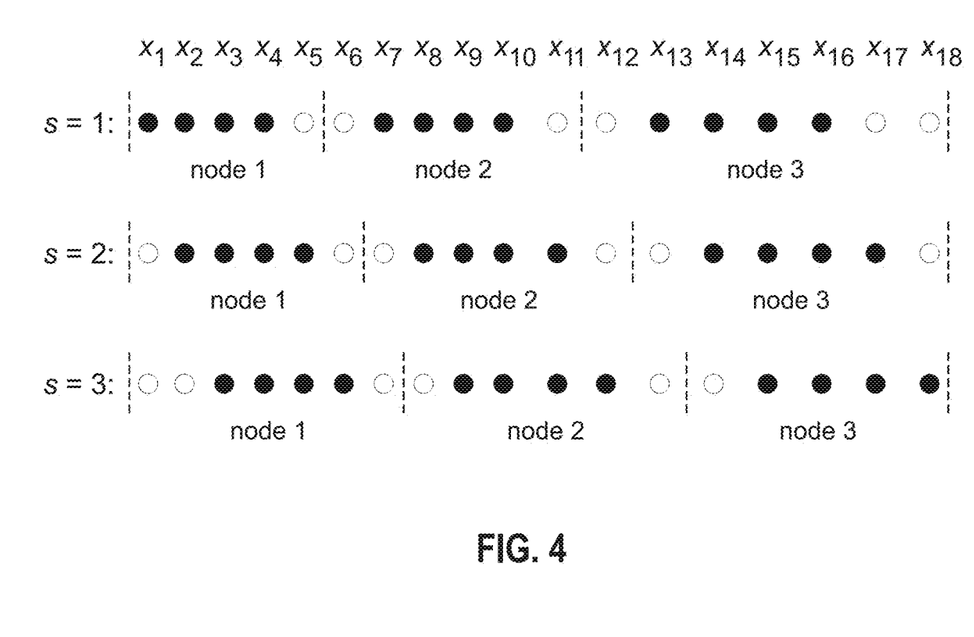
FIG. 4 depicts a graphical representation of a plurality of stratum elements with node assignments in accordance with an alternate embodiment.

FIG. 4 depicts an exemplary stratification scheme in accordance with the ADSGD embodiment. The ADSGD algorithm is similar to the previous embodiment. The A and b coefficients are distributed in the same manner, as are the components of x. Updates at distinct nodes can still be performed independently and in parallel. The main difference is that, within a node, updates to the various x components are no longer disjoint, so that the order in which updates are processed can no longer be arbitrary. However, one can still systematically sample each stratum element during a sub-epoch and systematically sample each stratum during an epoch, as described previously.

In one embodiment, to further address different problems dealing with time series, a multivariate time series variation is explored. In this embodiment, the approach to multivariate time series is similar to the univariate case, but with different options for choosing strata. Supposing that each data value $d_i$ is a vector of length v>1, a system of the form AX=B can be solved to compute the cubic-spline constants, where X, B∈ $\Re^{(m-1) \times v}$ and $$L(X) = \Sigma_{i=1}^{m-1} \Sigma_{j=1}^{m} L_{i,j}(X), \text{ where } L_{i,j}(X) = (A_i X_j - B_{i,j})^2$$

A stratum might be a Cartesian product of the form $U^s \times \{1, 2, \ldots v\}$, where $U^s$ is a set of i values as previously or the set $\{1, 2, \ldots v\}$, might be decomposed into a set of q overlapping or non-overlapping strata $Z^1, \ldots, Z^q$ and the overall strata might comprise all sets of the form $U^s \times Z^t$. The preferred stratification scheme may depend on the relative sizes of m and v.

The DSGD algorithm, particularly in the alternative ADSGD embodiment, can be used easily with MapReduce function. In one embodiment as will be described, a Hadoop implementation of DSGD is illustrated with an explanation of how the usual InputFormat operator is modified to lead to a map-only implementation with low network communication overhead.

The above concepts can be then applied to provide a technique that can allows for such calculation in parallel and using minimum amount of time and resources. In such a technique, a cluster of processors can be used in association with one or more computers. Each processor has at least one associated memory device, although in alternate embodiments more than one memory device can be used as well. Data can be assigned to the processors and some of the data are assigned to more than one of the processors. The data can reside on the associated memory devices. For each processor, data assigned are partitioned into strata and for each processor, one of the strata is selected for processing. In addition, for each processor, steps are executed asynchronously in a minimizing process for the data in the selected stratum. The last two steps can be repeated until (for at least one other stratum) until a stopping condition is reached. A stopping condition can include, for example. satisfying an accuracy criterion. Furthermore, some data are not in a given memory device associated with a given processor but are copied from the original memory device. In such a case, data are provided back to the same memory device prior to performing the last step and are then moved back to the originating memory device.

Figure 5A:
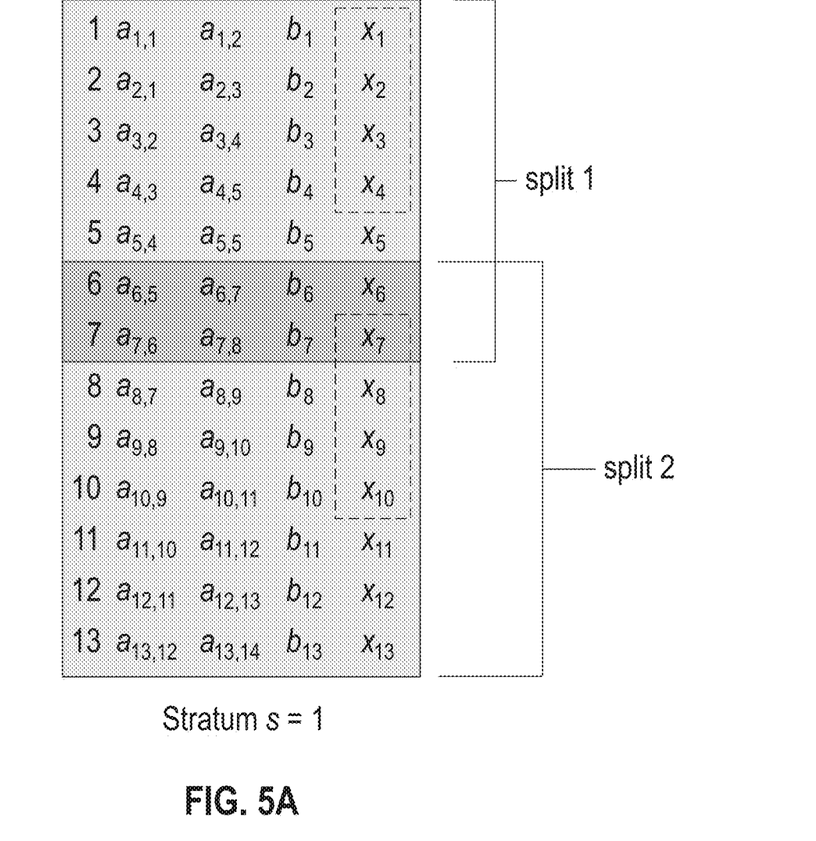
FIGS. 5A-C depict the processing by the DSGD algorithm of a sequence of three strata with different values in a Hadoop environment, namely with FIG. 5A showing the stratum value to be equal to 1 and FIGS. 5B and 5C having stratum value of 2 and 3 respectively in accordance with an embodiment.
Figure 5B:
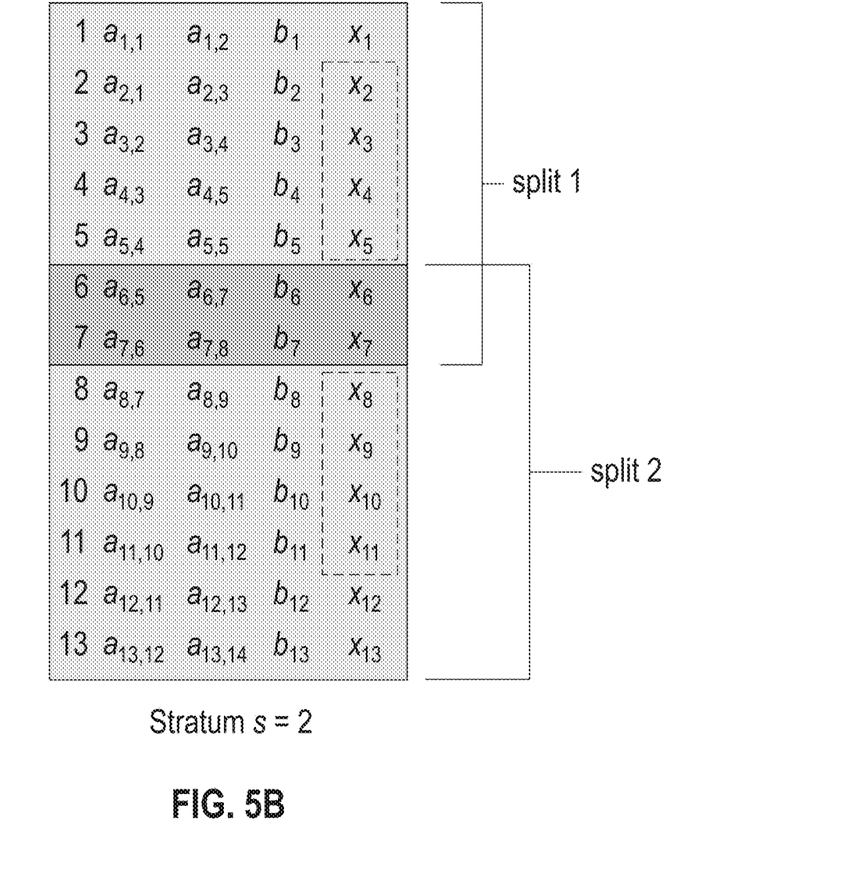
Figure 5C:
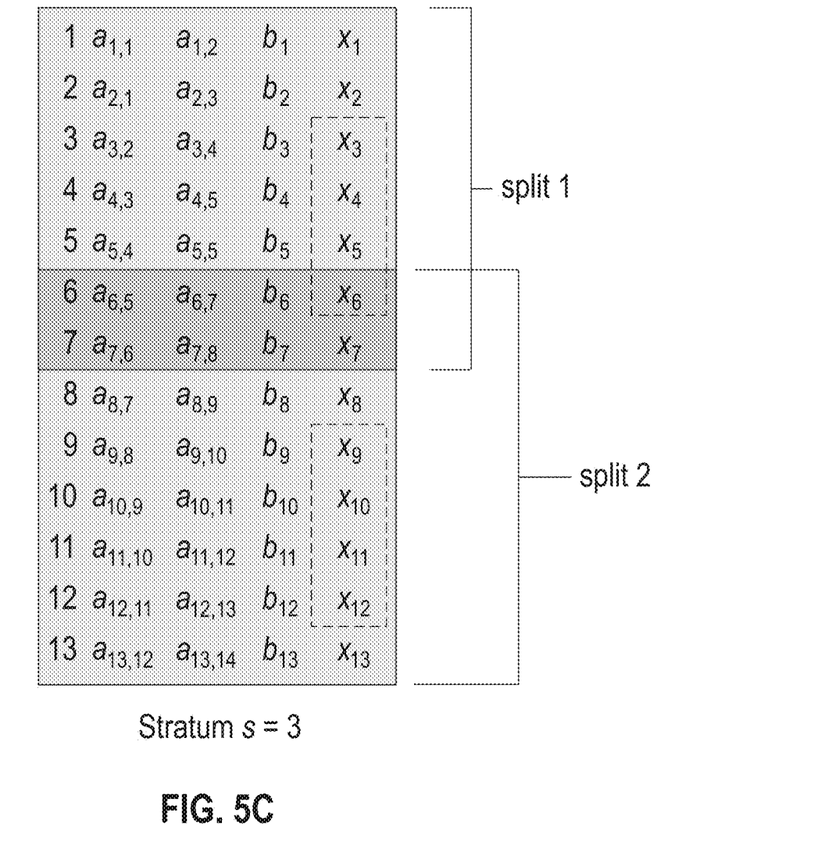

Referring back to MapReduce, in environments that use Hadoop, data are physically divided into disjoint blocks that have a default size of 64 Mb and are distributed across networked machines. The data are also logically divided into splits by the Hadoop InputFormat operator, and each mapper is assigned exactly one split to process. A split roughly contains one block's worth of data; typically, splits are disjoint, and the last few bytes of data in a split may physically reside in a different block. During the map phase of a MapReduce job, the mapper first obtains, over the network, any missing bytes in its split, then reads and processes the data in the split, and finally writes its output to local files. In the reduce phase, these local files are shuffled over the network to a set of reducers, who complete the data processing; the vast majority of the network traffic is generated in the reduce phase. In one embodiment, the DSGD algorithm can be implemented as a sequence of map-only jobs to minimize network communication costs. Each abstract "processing node" referred to previously corresponds to a mapper in Hadoop. Communication of data between mappers is effected by configuring the InputFormat to allow adjacent splits to overlap each other by a couple of rows. FIG. 5 depicts an example in which splits 1 and 2 share the rows corresponding to the components $x_6$ and $x_7$. (As discussed, mapper 1 processes the data in split 1 and mapper 2 processes the data in split 2.) In these figures, the dark shaded area indicates that rows 6 and 7 belong to both splits. The ith row contains the nonzero coefficients in the ith row of matrix A, along with $b_i$ and the initial value of $x_i$. Note that, except for i=1, it is not needed to explicitly store the coefficient $a_{i,i}$ since it can be computed from the adjacent coefficients as $$a_{i,i}=2(a_{i,i-1}+a_{i,i+1}).$$

There is only one physical copy of each of these rows: row 7 and part of row 6 are located in the block that primarily belongs to mapper 2, and the other part of row 6 is located in the block that primarily belongs to mapper 1.

Continuing with the example in FIG. 5, the first three strata visited by the ADSGD algorithm are stratum 1, stratum 2, and then stratum 3, as depicted in FIGS. 5(a), 5(b), and 5(c). In each of these figures, the x components corresponding to the current stratum are enclosed in a dashed rectangle. As illustrated in FIG. 5(a), during processing of stratum 1, mapper 1 retrieves data for rows 6 and 7 over the network, and then updates the values of $x_1$-$x_4$ using the data in rows 1-5. Similarly, after obtaining its missing "boundary data", mapper 2 updates the values of $x_7$-$x_{10}$ using the data in rows 6-11. In this figure, the dashed rectangles indicate the $x_i$ values that are updated. (For this first iteration, the data fetched over the network is not actually used in the computations.) Because of the design of the strata, there are no read/write conflicts between mappers 1 and 2. The new version of split 1 is output by mapper 1 as part 1 and the updated split 2 is output by mapper 2 as part 2. The next map job processes stratum 2 as shown in FIG. 5(b). Mapper 1 updates $x_2$-$x_5$ based on rows 1-6 and mapper 2 updates $x_8$-$x_{11}$ based on rows 7-12. When processing stratum 3 as in FIG. 5(c), mapper 1 first obtains part of row 6 and row 7 over the network, before updating $x_3$-$x_6$ based on rows 2-7l. Row 7 has previously been updated by mapper 2, and this modification is therefore "passed" by mapper 2 to mapper 1 during this initialization phase of the map-processing step. Similarly, after obtaining its upper-boundary data, mapper 2 updates $x_9$-$x_{12}$ based on rows 8-13.

As can be seen from the example, the only actual data transfer over a network occurs during the standard initialization phase of each map job, and less than 2M rows are transferred overall, where M is the number of mappers. Thus the network overhead for DSGD is minimal relative to algorithms that require reduce phases.

The stochastic approximation can function with step size sequences roughly of the form $$\epsilon=1/n^\alpha \text{ with } \alpha\in(0.5,1]$$

Theorem 1.1 provides for asymptotic convergence for such choices. To achieve faster convergence over the finite number of steps that are actually executed, an adaptive method for choosing the step size sequence can be used. In contrast to SGD in general, one can determine the current loss after every epoch, and thus can check whether the loss has decreased or increased from the previous epoch. A heuristic called bold driver, which is often used for gradient descent, can be implemented in one embodiment.

Starting from an initial step size $\epsilon_0$, the algorithm may (1) increase the step size by a small percentage (e.g., 5%) whenever the loss decreases over an epoch, and (2) drastically decrease the step size (e.g., by 50%) if the loss increases. Within each epoch, the step size remains fixed. Given a reasonable choice of $\epsilon_0$, the bold driver method works extremely well. To pick $\epsilon_0$, one can leverage the fact that many compute nodes are available, replicating a small subsequence of the data to each node and trying different step sizes in parallel. Specifically, in one example, step sizes 1, $\frac{1}{2}$, $\frac{1}{4}$; . . . , $\frac{1}{2}^{d-1}$ are tried and the step size that gives the best result is selected as $\epsilon_0$. As long as the loss decreases, one can repeat a variation of this process after every epoch, trying step sizes within a factor of [$\frac{1}{2}$, 2] of the current step size. Eventually, the step size will become too large and the loss will increase. Intuitively, this happens when the iterate has moved closer to the global solution than to the local solution for the current stratum.

A set of experiments that was conducted to study the convergence rate, solution quality, and scalability of the two DSGD variants relative to alternative methods provide the following results. Overall, the convergence rate and quality of the cubic-spline solution for DSGD was on par or better than the alternatives, and DSGD appeared to scale well.

There is a paramount need for transforming massive time-series data at scale when composing large-scale, high-resolution simulation models, as in Splash, and when integrating data in other settings. In one embodiment, a DSGD algorithm was provided that allows scalable cubic-spline interpolation of time series and is well suited to MapReduce environments. In one embodiment, specifically, a map-only Hadoop implementation was discussed that minimizes network communication.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and software.

What is claimed is:

1. A method, comprising:
    receiving a request for generating a set of target time-series data from a set of source time-series data;
    obtaining specification information relating to said set of target time-series data and obtaining specification information relating to said set of source time-series data, said specifications information for said source time-series data and said target time-series data including time intervals between data values, the source time-series data having different time variables than time variables associated with the target time-series data; and
    converting said set of source time-series data to said set of target time-series data, wherein said converting includes calculating a set of cubic-spline interpolation constants via a stochastic gradient descent technique.

2. The method of claim 1, wherein said calculating is performed by a plurality of processors, the method further comprising:
    assigning a portion of data to a subgroup of said processors such that said data portion is divided in a plurality of strata among different processors.

3. The method of claim 2, wherein said calculating a set of cubic-spline interpolation constants is made based on a plurality of equations having a diagonal structure.

4. The method of claim 2, wherein each processor is only assigned one stratum and said processors process data in said strata simultaneously.

5. The method of claim 4, wherein said strata are overlapping to provide data flow between processors.

6. The method of claim 5, wherein said processing of data continues until there are either no more data to process or a data stopping condition is encountered.

7. The method of claim 6, wherein data are retrieved and stored in a memory that is in processing communication with said plurality of processors.

8. The method of claim 7, wherein data are retrieved and stored in a plurality of memory devices and portions of said data are stored in different processors.

9. The method of claim 8, wherein said calculating a set of cubic-spline interpolation constants is made based on a plurality of linear equations.

10. The method of claim 9, wherein said linear equations have a diagonal structure.

11. The method of claim 1, wherein said converting employs an algorithm that uses a plurality of linear equations to calculate said cubic-spline interpolation.

12. The method of claim 11, wherein said converting employs an algorithm that uses a plurality of linear equations having a unique solution for calculating a cubic spline interpolation constant.

13. The method of claim 12, wherein said algorithm is that of a natural cubic-spline interpolation formula.

14. The method of claim 13, wherein an initial approximation is made for calculating constants for said cubic-spline interpolation formula.

15. The method of claim 14, wherein said plurality of linear equations has a diagonal structure and said initial approximation is made by obtaining data from said diagonal portion of said diagonal structure.

16. A computer program product for providing time alignment, the computer program product comprising a computer readable storage medium having computer readable program code embodied therewith, said computer readable program code being executable by a processor to:
   receive a request for generating a set of target time-series data from a set of source time-series data;
   obtain specification information relating to said set of target time-series data, and obtaining specification information relating to said set of source time-series data, said target time-series information and said source time-series specification information including time intervals between data values, the source time-series data having different time variables than time variables associated with the target time-series data;
   convert said set of source time-series data to said set of target time-series data, wherein said converting includes calculating a set of cubic-spline interpolation constants via a stochastic gradient descent technique.

17. The program product of claim 16, wherein said conversion is performed by a plurality of processors the program code being executableby the processors to: assign a portion of data to a subgroup of said processors such that said data portion is divided in a plurality of strata among different processors.

18. The program product of claim 17, wherein each processor is only assigned one stratum and said processors process data in said strata simultaneously.

19. A method for use with a cluster of processors each of which has at least one associated memory device, comprising:
   (a) assigning data to said processors, wherein some of said data are assigned to more than one of said processors, said data residing on said associated memory device(s);
   (b) for each processor, partitioning said data assigned to that processor into a plurality of strata;
   (c) for each processor, selecting one of said plurality of strata for processing;
   (d) for each processor, asynchronously executing steps in a minimizing process for said data in each of said selected stratum; and
   (e) repeating steps (c) and (d) for at least one other stratum until a stopping condition is reached.

20. The method of claim 19, wherein said stopping condition includes satisfying an accuracy criterion.

21. The method of claim 19, wherein said some data are not in a given memory device associated with a given processor but are copied from a memory device in which said data were originally retrieved from.

22. The method claim 21, wherein said data are given to said memory device prior to step (d), and subsequent to step (d), are moved back to the originating memory device.

23. The method of claim 19, wherein said data represent a system of linear equations having diagonal structure.

24. The method of claim 23, wherein said system of linear equations has a unique solution, and wherein said solution corresponds to the constants in a standard cubic spline interpolation formula.

25. The method of claim 24, wherein said formula is said natural cubic spline interpolation formula.

* * * * *